US011330103B1

(12) United States Patent
Zhu

(10) Patent No.: US 11,330,103 B1
(45) Date of Patent: May 10, 2022

(54) CALL STATE NOTIFICATION FOR EMERGENCY CALL PROCESSING

(71) Applicant: T-Mobile USA, Inc., Bellevue, WA (US)

(72) Inventor: Yinjun Zhu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/142,006

(22) Filed: Jan. 5, 2021

(51) Int. Cl.
| | | |
|---|---|---|
| *H04M 3/51* | (2006.01) |
| *H04L 29/06* | (2006.01) |
| *H04L 12/24* | (2006.01) |
| *H04M 3/523* | (2006.01) |
| *H04L 65/10* | (2022.01) |
| *H04L 65/1016* | (2022.01) |
| *H04L 41/06* | (2022.01) |
| *H04L 65/1066* | (2022.01) |

(52) U.S. Cl.
CPC ........... *H04M 3/5116* (2013.01); *H04L 41/06* (2013.01); *H04L 65/1006* (2013.01); *H04L 65/1016* (2013.01); *H04L 65/1066* (2013.01); *H04M 3/523* (2013.01); *H04M 2242/04* (2013.01)

(58) Field of Classification Search
USPC .................................... 370/352; 379/52, 37
See application file for complete search history.

(56) References Cited

U.S. PATENT DOCUMENTS

| | | | | |
|---|---|---|---|---|
| 2007/0280447 | A1* | 12/2007 | Cai ..................... | H04M 15/785 379/114.03 |
| 2015/0092537 | A1* | 4/2015 | Biage .................. | H04M 3/5116 370/220 |
| 2016/0150574 | A1* | 5/2016 | Edge .................... | H04W 4/029 455/404.2 |

* cited by examiner

*Primary Examiner* — Maria El-Zoobi
(74) *Attorney, Agent, or Firm* — Lee & Hayes, P.C.

(57) ABSTRACT

Described herein are techniques, devices, and systems for monitoring failures associated with emergency calls. An IP multimedia subsystem (IMS) node can receive a session initiation protocol (SIP) request associated with a communication session associated with an emergency call for a user equipment (UE). The IMS node can transmit a first SIP notification to a location retrieval function (LRF). The IMS node can receive status information and set a call state associated with routing of the emergency call. The IMS node can transmit a second SIP notification based on the call state, the second SIP notification including information associated with a failure of processing of the emergency call.

20 Claims, 6 Drawing Sheets

CALL STATE NOTIFICATION FOR EMERGENCY CALL PROCESSING

BACKGROUND

When a user dials 911 (in the United States) on his/her user equipment (UE) to place an emergency call, the emergency call is routed by an IP multimedia subsystem (IMS) core network ("IMS network"). The IMS network includes various network nodes that route the emergency call to a public-safety answering point (PSAP). The PSAP processes the emergency call and dispatches emergency services.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for emergency call processing. According to those techniques, an IP multimedia subsystem (IMS) core network ("IMS network") can include an emergency call session control function (E-CSCF) node ("E-CSCF") to route an emergency call. The E-CSCF can route the emergency call based on a session initiation protocol (SIP) request that is transmitted by a user equipment (UE). The E-CSCF can receive the SIP request and initiate the emergency call toward a public-safety answering point (PSAP). The E-CSCF can monitor a status of the emergency call. The status can include information indicating whether the emergency call has been initialized, the emergency call has been routed but not completed such as due to a failure, or the emergency call has been completed. The E-CSCF can send the status of the emergency call to a location retrieval function (LRF)/gateway mobile location center (GMLC), the status including information associated with the failure of the emergency call. The information associated with the failure can indicate an error associated with any of another IMS node in the IMS network, a gateway utilized to route signals between the IMS network and the IP network and/or the PSAP. By employing the above technique, or other techniques described herein, the status of the emergency call and the information associated with the failure can be quickly and efficiently determined.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Call State Notification for Emergency Call Processing

Figure 1A:
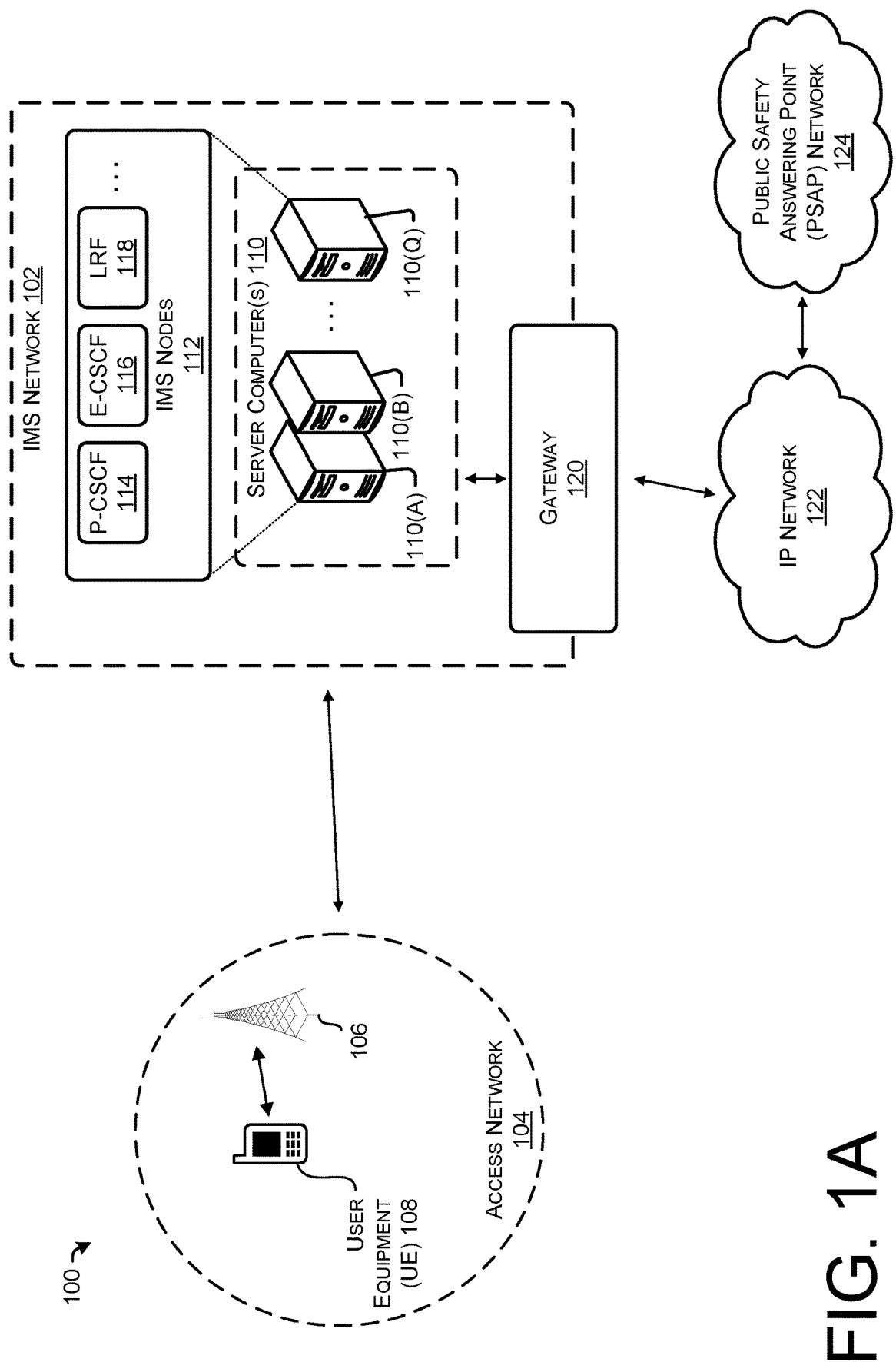
FIG. 1A schematically illustrates an example network environment for processing emergency calls, in accordance with some examples of the present disclosure.

FIG. 1A is an example network environment 100 for processing emergency calls, in accordance with some examples of the present disclosure. The network environment 100 can include an IP multimedia subsystem (IMS) core network ("IMS network") 102 and an access network 104 that is associated with a wireless service provider. The environment 100 is illustrated in simplified form and can include many more components.

The environment 100 can include one or more nodes (e.g., node 106), which can also be referred to herein as "cells." The node 106 can be a wireless node or a wired node that is coupled to the IMS network 102 and/or some other network. The node 106 can handle traffic and signals between more or more electronic devices, such as the user equipment (UE) (e.g., UE 108), and the IMS network 102. For example, the node 106 can perform the transcoding of speech channels, allocation of radio channels to electronic devices, paging, transmission and reception of voice and data, as well as other functions. The node 106 can include one or more base transceiver stations (BTS). Each BTS can include one or more transceivers, one or more antennas, and one or more additional network switches and control equipment that provide a network cell for facilitating wireless communication between UE computing devices and the IMS network 102. The node 106 and one or more other nodes have any type or amount of overlapping coverage or mutually exclusive coverage. In some examples, the node 106 includes a gNodeB and/or an eNodeB.

In some instances, the environment 100 can further include one or more servers computer 110, to facilitate communications by and between the various devices in the environment 100 and perform operations relating to processing of emergency calls. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 108, the access network 104, and one or more endpoints of the network (e.g., server computers 110(A)-110(Q), websites, etc.). While FIG. 1 illustrates an example environment 100, it is understood in the context of this document, that the techniques discussed herein may also be implemented in other networking technologies.

The access network 104 can be any sort of access network, such as a GSM or UMTS network. The access network 104 can include any aspects of one or more of second, third, fourth generation, and fifth generation (2G, 3G, 4G, and 5G) cellular-wireless access technologies. The access network 104 can also be referred to as a universal terrestrial radio network (UTRAN) or a GSM EDGE radio access network (GERAN) and can include one or more base stations, as well as a radio network controller (RNC). As briefly discussed above, a network, such as an access network 104 associated with a wireless telecommunication service provider.

As illustrated, the server computer(s) 110 can include one or more IMS nodes 112. The IMS node(s) 112 can include a proxy call session control function (P-CSCF) node ("P-CSCF") 114, an emergency call session control function (E-CSCF) node ("E-CSCF") 116, and a location retrieval function (LRF) 118. The P-CSCF 114 can provide first-hop access as first point of contact in a signaling plane between the UE 108 and the IMS network 102. The P-CSCF 114 can act as an inbound/outbound session initiation protocol (SIP) proxy server, routing requests initiated by, or destined for, the UE 108. For example, the P-CSCF 114 can receive an emergency call, and process the emergency call as an emergency session request, such as by sending (e.g., forwarding) the emergency session request to a next hop in the IMS network 102 (e.g., the E-CSCF 116). The P-CSCF 114 can receive a SIP request as the emergency session request. However, the emergency session request is not limited as such and can be any message that is sent from the UE 108 to the IMS network 102 using SIP protocol. The P-CSCF 114 can transmit an emergency session response to the UE 108, based on the emergency session request. The P-CSCF 114 can transmit a SIP response as the emergency session response. However, the emergency session response is not limited as such and can be any message that is sent from the IMS network 102 using SIP protocol. The P-CSCF 114 can provide security functions associated with the UE 108, maintaining a secure association with the UE 108. The P-CSCF 114 can authenticate an identity of a user of the UE 108, assert the identity to other IMS nodes, and verify that the SIP request sent by the UE 108 complies with SIP rules. The P-CSCF 114 can process an emergency call session associated with the UE 108. The emergency call session can be associated with an emergency call initiated by the UE 108.

The E-CSCF 116 can receive, as the next hop from the P-CSCF 114, the emergency call from the P-CSCF 114. The E-CSCF 116 can receive, from the LRF 118, location information (e.g., geographical location information). For example, the E-CSCF 116 can receive the location information based on previously obtained location information that is forwarded to the LRF 118 for validation of geographical location information in the case that the geographical location information is included by the UE 108 over any access network type. Alternatively or additionally, the location information can include location information that was previously not available to the E-CSCF 116 and is required for processing the emergency call session. The E-CSCF 116 can receive the location information based on the emergency call, the location information including location information associated with the UE 108 and/or the emergency call. The location information can include interim location information, initial location information, and/or updated location information.

The LRF 118 can interact with, or operate to perform operations via, a gateway mobile location center (GMLC) that is separate from the LRF 118; and/or, the LRF 118 include a GMLC that is integrated within, and utilized to perform operations by or for, the LRF 118. The LRF 118 can obtain, via the GMLC, the location information and provide the location information to the E-CSCF 116. The GMLC can interface, as a control plane system, with emergency and commercial location clients (LCSs) to obtain the location information provided to the LRF 118. However, the LRF 118 is not limited as such and can interact with, or include, other types of location server functions to obtain location information. The LRF 118 can include a routing determination function (RDF) and receive, via the RDF, an allocated outgoing address. The LRF 118 can transmit the allocated outgoing address to the E-CSCF 116, which can utilize the allocated outgoing address to route the emergency call.

In some instances, the environment 100 can further include a gateway 120, an IP network 122, and a public safety answering point (PSAP) network 124. By way of example, the gateway 120 can include one or more breakout gateway control functions (BGCFs). Each of the BGCFs can include, as a SIP server, routing functionality based on telephone numbers. The gateway 120 can be utilized in an emergency call session initiated in the UE 108. The gateway 120 can be implemented as part of, or integrated with, the IMS network 102, or can be separate from the IMS network 102. The emergency call can be received by the gateway 120 from the E-CSCF 116. Alternatively, the emergency call can be received by the gateway 120 from the E-CSCF 116, via another IMS node (e.g., a serving call session control function (S-CSCF) node ("S-CSCF")). The gateway 120 can determine a next hop, with respect to the gateway 120, for routing the emergency call. The gateway 120 can determine the next hop based on information received in a signaling protocol, administrative information, and/or database access.

The gateway 120 can route the emergency call received from the E-CSCF 116, based on the location information obtained and provided by the LRF 118. In some examples, the gateway 120 can route the emergency call to the PSAP network 124 (e.g., a SIP/IP NG 911 PSAP) and via the IP network 122, based on signaling provided to the PSAP network 124 via SIP/IP end-to-end. In such examples, the emergency call can be routed from the UE 108 to the PSAP network 124 without a circuit switch network.

In some examples, the gateway 120 can route the emergency call to the PSAP network 124 and via the IP network 122, the IP network 122 being a SIP/IP network. In such examples, a last mile to the PSAP network 124 (e.g., a circuit switch PSAP or a SIP/IP NG911 PSAP) can be circuit switched. The circuit switch network can include a public switched telephone network (PSTN) or a public land mobile network (PLMN). The gateway 120 can determine, for example, a network associated with a public switched telephone network/circuit switched (PSTN/CS) domain breakout, and control interworking between the E-CSCF 116 and the circuit switched network. The emergency call can be routed, via the network associated with the PSTN/CS domain breakout, and via the IP network 122, to a PSAP in the PSAP network 124. For example, the emergency call can be routed by the IP network 122 to an administration (admin) line of the PSAP or an emergency call center associated with the PSAP. The emergency call center can be part of, or separate from, the PSAP.

In some examples, the gateway 120 can route the emergency call to the PSAP network 124 (e.g., a circuit switch PSAP) and via the IP network 122, the IP network 122 being a circuit switch network or including a circuit switch network. In such examples, a last mile to the PSAP network 124 can be circuit switched.

The gateway 120 can initiate and send, to the LRF 118, an automatic location identification (ALI) query, based on the emergency call session routed by the E-CSCF 116. The ALI query can be transmitted by the gateway 120 based on outbound signaling for the gateway 120 to the PSAP network 124 being propagated by a circuit switch network. For example, the ALI query can be transmitted based on the emergency call being routed between the gateway 120 and the PSAP network 124, without a SIP/IP network. The ALI query sent to the LRF 118 can indicate that the emergency call session was received by the gateway 120.

The E-CSCF 116 can monitor a call processing status associated with the emergency call by sending, to the LRF 118, requests for the call processing status. The call processing status can be set by the E-CSCF 116 based on SIP signals transmitted to, or SIP signals received from, the LRF 118. The SIP signals can be received based on requests (e.g., the emergency call) sent by the E-CSCF 116. The SIP signals received from the LRF 118 can be received with or without tags. For example, any of the tags can include a proceeding tag.

The E-CSCF 116 can set the call processing status to an initialization status (e.g., a trying state), based on the E-CSCF 116 receiving the emergency call from the UE 108, such as via the P-CSCF 114. The E-CSCF 116 can set the call processing status to a proceeding status (e.g., a proceeding state), based on a session signal (e.g., "SIP signal 1*xx*" (e.g., "SIP signal 100")) without a tag being received from the LRF 118. The session signal without the tag can be utilized by the E-CSCF 116 to create a state, indicated via an information document (e.g., a half-dialog information document). The information document can include information (e.g., half-dialog information) based on the session signal. The E-CSCF 116 can set the call processing status to a routed but not yet completed status (e.g., an early state), based on a session signal (e.g., "SIP signal 1*xx*" (e.g., "SIP signal 183")) with a tag (e.g., proceeding tag) being received from the LRF 118. The session signal with the tag can be utilized by the E-CSCF 116 to create a state, indicated via an information document (e.g., a dialog (e.g., full dialog) information document). The information document can include information (e.g., dialog (e.g., full dialog) information) based on the session signal. The E-CSCF 116 can set the call processing status to a confirmed status (e.g., a confirmed state), based on a session signal (e.g., "SIP signal 2*xx*" (e.g., "SIP signal 200")) being received from the LRF 118. The E-CSCF 116 can set the call processing state to a re-attempt status (e.g., a re-attempt state), based on a session failure signal being received. For example, the E-CSCF 116 can set the call processing status to a re-attempt status based on a session signal (e.g., failure signal) being received from another IMS Node 112 (e.g., the LRF 118), the gateway 120, the IP network 122 via the gateway 120, and/or the PSAP network via the gateway 120. The E-CSCF 116 can set the call processing state to a session completed status (e.g., a terminated state), based on a termination of the emergency session, and/or further based on a session signal (e.g., termination signal) being received from the LRF 118. The E-CSCF 116 can transmit a notification (e.g., one or more notification signals) to the LRF 118 (e.g., the GMLC), based on any of the above call processing statuses. Bay way of example, the E-CSCF 116 can transmit the notification to the GMLC implemented separate from, or integrated within, the LRF 118.

Therefore, and as described herein, an E-CSCF can be utilized to track failures associated with routing of the emergency call. The failures can be tracked based on SIP signals exchanged between the E-CSCF and other devices with the IMS network or external networks, such as the PSAP network. The E-CSCF can send notify signals to the GMLC, which can store information received via the notify signals. The information received from the E-CSCF can be stored in the GMLC and utilized to generate reports based on the market in which the UE is operating, the PSAP that receives the emergency call, the type or identifier of the UE, the location of the UE, etc.

The GMLC can monitor individual call processing states. Because the GMLC also tracks a location of the UE, and determines a destination associated with routing of the emergency call, the GMLC can efficiently provide information associate with routing of the emergency call. The GMLC can efficiently provide complete information associated with routing of the emergency call, without requiring querying of other sources of information as in conventional technology.

Although the IMS nodes 112 discussed above can be separate nodes, implementation of the IMS nodes is not limited as such and can include any combination of one or more of any of the IMS nodes as a single node. Although the SIP request discussed above is routed in order from the P-CSCF 114, the E-CSCF 116, the BGCF, and the PSAP, routing of the SIP request is not limited as such and can include any number of SIP requests being routed between any combination of the IMS nodes 112 in any order. For example, any of the IMS nodes 112 can be a next hop with respect to any other of the IMS nodes 112. Although various features are discussed above as being performed by the gateway 120, those features are not limited as such and can be performed by one or more components, such one or more BGCFs associated with the gateway 120. Although various features are discussed above as being performed by the LRF 118, those features are not limited as such and can be performed by one or more components, such as one or more GMLCs.

Figure 1B:
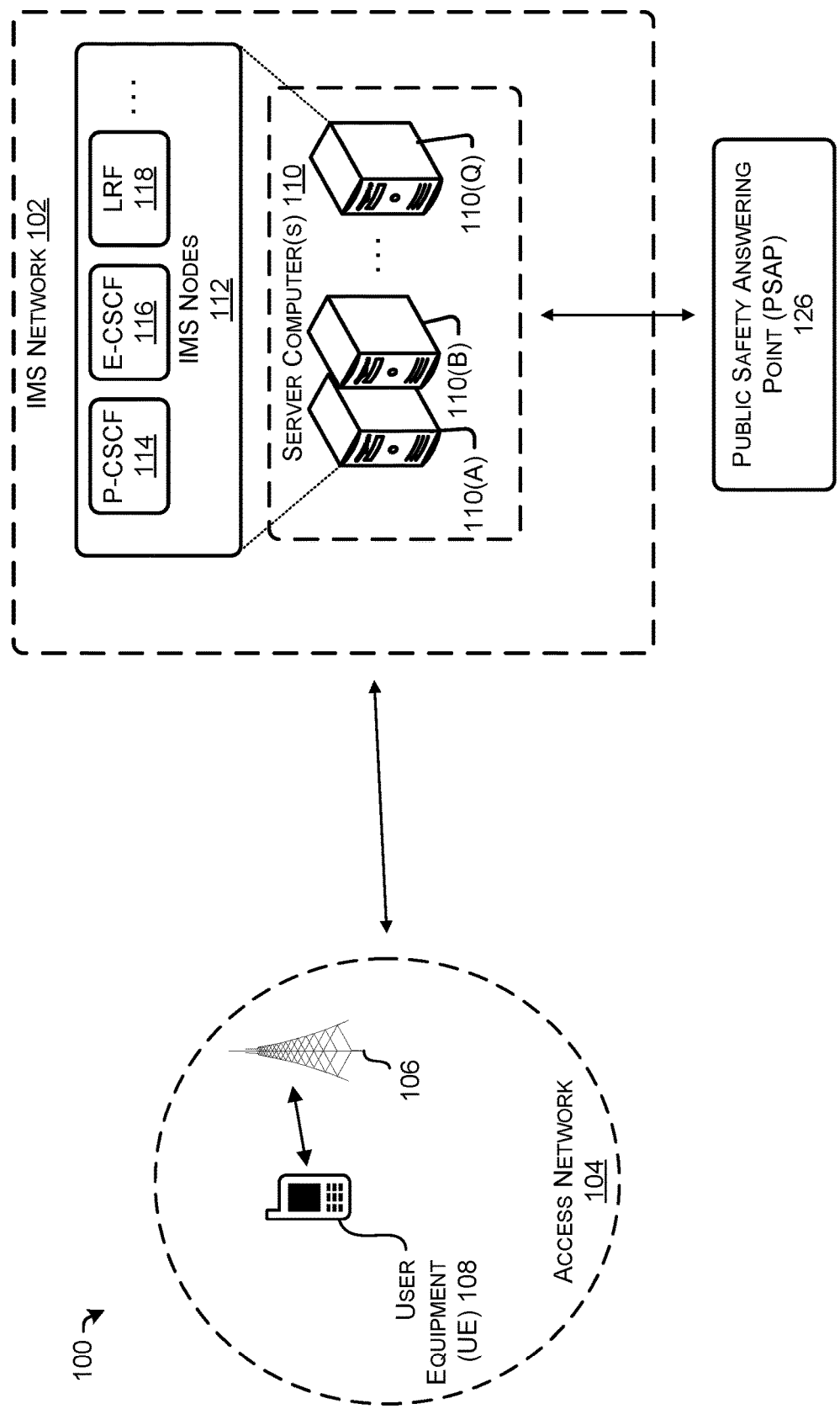
FIG. 1B is an example network environment 100 for processing emergency calls, in accordance with some examples of the present disclosure.

FIG. 1B is an example network environment 100 for processing emergency calls, in accordance with some examples of the present disclosure. In this example, the network environment 100 can include an IP multimedia subsystem (IMS) core network ("IMS network") 102 and an access network 104 that is associated with a wireless service provider, as in FIG. 1A, but without the gateway 120. The IMS network 102 and the access network 104 in FIG. 1B can be implemented by, respectively, the IMS network 102 and the access network 104 in FIG. 1A.

In some instances, the network environment 100 can include a public safety answering point (PSAP) network including one or more PSAPs (e.g., PSAP 126). The PSAP 126 can be implemented as similarly as for each the PSAPs in the PSAP network 124, except with IP functionality instead of circuit-switched functionality. For example, the PSAP 126 can be a purely IP public safety answering point (PSAP). The PSAP 126 can interface with the IMS network 102 directly. For example, the PSAP 126 can interface with the IMS network 102 without utilizing the gateway 120. The network environment 100 can include a fully integrated end-to-end session initiation protocol (SIP) network, including, for example, the IMS network 102, the access network 104, and the PSAP network including the PSAP 126. The IMS network 102 may not receive automatic location identification (ALI) queries, due to all of the emergency call messages processed by all portions of the fully integrated end-to-end SIP network being SIP messages.

Figure 2:
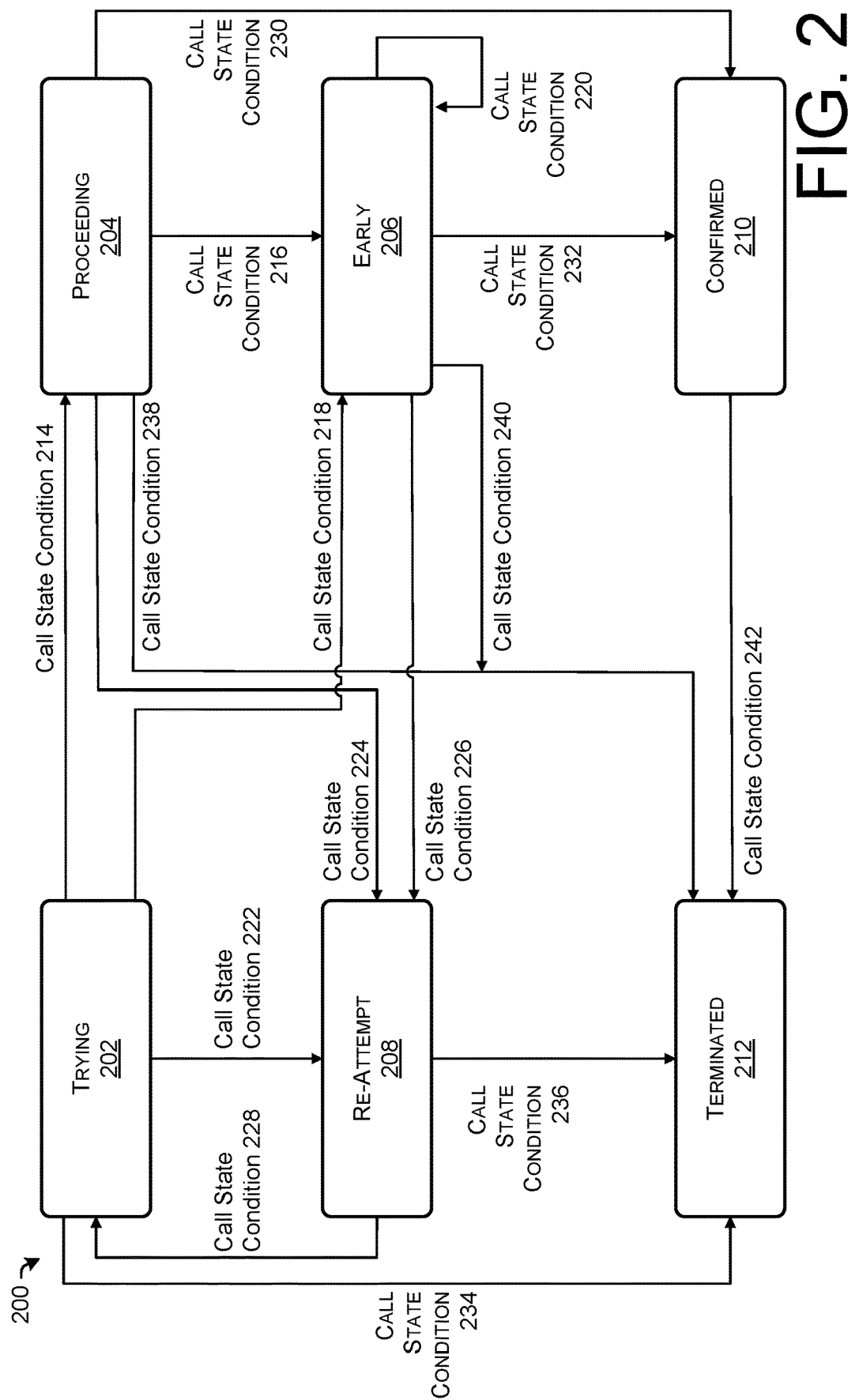
FIG. 2 is a diagram illustrating example chart showing a call state machine including call session states for an emergency-call session control function (E-CSCF) node, as described herein.

FIG. 2 is a diagram illustrating example chart showing a call state machine 200 including call session states for an emergency-call session control function (E-CSCF) node (e.g., E-CSCF 116), as described herein. The call state machine can be stored in the E-CSCF 116 and utilized by the E-CSCF 116 to monitor a call processing status associated with an emergency call. The call state machine can include a call state attribute associated with the emergency call being set as a trying state 202, a proceeding state 204, an early state 206, a re-attempt state 208, a confirmed state 210, and/or a terminated state 212. The emergency call state can be changed from one state (e.g., a current state) to another state (e.g., a subsequent and different state) based on conditions (e.g., call state conditions).

The call state machine 200 can include the call state attribute (e.g., state) set as the trying state 202. The call state machine 200 can set the emergency call state (e.g., an initial state) as the trying state 202, based on determining a UE (e.g., UE 108) has initiated an emergency call. The emergency call state can be set as the trying state 202, based on the E-CSCF 116 determining an emergency session invitation has been transmitted. By way of example, the emergency call state can be set as the trying state 202, based on the emergency session invitation being transmitted by the UE 108 and to the LRF 118. Additionally or alternatively, the emergency session invitation can be further transmitted and routed as a separate signal to a public safety answering point (PSAP) network (e.g., PSAP network 124, via a gateway (e.g., gateway 120) and/or an IP network (e.g., IP network 122)) (e.g., PSAP 126). In another example, the emergency call state can be set as the trying state 202, based on the emergency session invitation being transmitted to the LRF 118 and/or the PSAP. The E-CSCF 116 can send the emergency session invitation based on the E-CSCF 116 receiving an emergency call from the UE 108, via a proxy call session control function (P-CSCF) node (e.g., P-CSCF 114). Based on the emergency call state being set as the trying state 202, the E-CSCF 116 can route the emergency call, as an emergency session invitation, to a gateway (e.g., gateway 120) or a mobile switching station (MSS).

The call state machine 200 can include the state set as the proceeding state 204. The emergency call state can be set as the proceeding state 204 by changing the state from a current state (e.g., the state set as the trying state 202) to the proceeding state 204. The emergency call state can be set as the proceeding state 204 based on a call session signal (e.g., "session initiation protocol (SIP) signal 1xx" (e.g., "SIP signal 100")) without a tag being received from the LRF 118.

In some examples, the call state machine 200 can include the state set as the proceeding state 204, based on a call state condition 214. The call state condition 214 can be associated with a call session signal (e.g., "SIP signal 1xx" (e.g., "SIP signal 100")) being received without a tag, from the LRF 118.

The call state machine 200 can include the state set as the early state 206. The emergency call state can be set as the early state 206 by changing the state from being set as a current state (e.g., the state set as the trying state 202 or the proceeding state 204) to being set as the early state 206. The emergency call state can be set as the early state 206 based on a call session signal (e.g., "SIP signal 1xx" (e.g., "SIP signal 100")) with a tag (e.g., an initial tag or a different tag) being received from the LRF 118.

In some examples, the call state machine 200 can include the state set as the early state 206, based on one or more of a call state condition 216, a call state condition 218, or a call state condition 220. The call state condition 216, the call state condition 218, or the call state condition 220 can be associated with a call session signal (e.g., "SIP signal 1xx" (e.g., "SIP signal 100")) with a tag being received from the LRF 118. Alternatively or additionally, the call state condition 220 can be associated with a call session signal (e.g., "SIP signal 1xx" (e.g., "SIP signal 100")) with a different tag being received from the LRF 118. The call session signal associated with the call state condition 220 can be received with the different tag subsequent to one or more of the call session signal associated with the call state condition 216, the call state condition 218, or the call state condition 220 being received with the tag.

The call state machine 200 can set and/or update the state associated with the emergency call based on attribute information. The E-CSCF 116 can store emergency call processing information that includes the attribute information. The attribute information can include the call state attribute, an event attribute, and/or an error attribute (e.g., code attribute) associated with routing of the emergency call. The call state attribute can include an identifier indicating the emergency call state of the E-CSCF 116.

The event attribute can indicate that the emergency call was processed or was not processed by an PSAP. The event attribute can indicate a status including a reject status, an error status, a replaced status, a canceled status, a local-bye status, a remote-bye status, and/or an end of route status (e.g., an end of route option status). The error attribute, based on the emergency call not being successfully processed as a result of an error, can indicate a type of the error. The error attribute can include an error code (e.g., SIP error code). The error attribute can indicate the error status. For example, an error code (e.g., "4xx" or "5xx") can be included as the error attribute, based on the error status being associated with a SIP signal (e.g., the "SIP signal 4xx" or "SIP signal 5xx," respectively) received by the E-CSCF 116.

In some examples, the attribute information (e.g., any of the event attribute, the error attribute, and the call state attribute) can be determined, stored, and/or changed/updated in the E-CSCF 116 based on status information (e.g., intermediary status information) associated with routing of the emergency call. The intermediary status information can be received via one or more intermediary status signals received by the E-CSCF 116. By way of example, the intermediary status signal(s) associated with the error status can include an error signal (e.g., "SIP signal 4xx" (e.g., "SIP signal 486")) (e.g., "SIP signal 5xx" (e.g., "SIP signal 503")) associated with an error code (e.g., SIP error code). By way of example, the "SIP signal 486" received by the E-CSCF 116 can indicate that any device to which the emergency call is routed from the E-CSCF 116 is busy and/or unable to receive or process the emergency call (e.g., the device to which the emergency call was routed from the E-CSCF 116 is handling another call). In another example, the "SIP signal 503" received by the E-CSCF 116 can indicate that any device (e.g., any device in the IMS network 102 (e.g., the gateway 120), the IP network 122, the 124, or another network) to which the emergency call is routed from the E-CSCF 116 is undergoing maintenance or is temporarily overloaded and/or unable to process the request.

The reject status can indicate that the emergency call has been rejected by a device utilized to route the emergency call. The error status can indicate that routing of the emergency call has undergone an error. The replaced status can indicate that routing of the emergency call has been replaced with routing of another emergency call. For example, the replaced status can be associated with the emergency call being replaced with a new emergency call, the new emergency call being associated with a new emergency call invitation transmitted by the UE 108. The canceled status can indicate that that routing of the emergency call has been canceled due to a user of the UE 108 hanging up and/or ending the call. The end of route status can indicate that routing and/or processing of the emergency call by a route option has been completed, which can include the routing of the emergency call by the route option being successful or unsuccessfully completed. The end of route status can be associated with a last resort option (LRO) state (e.g., a state associated with the routing option being received, from the LRF 118, as an LRO). The route option can be provided, by the LRF 118 and to the E-CSCF 116, in a contact header of a session signal (e.g., a "SIP signal 300" response). The session response signal can be transmitted by the LRF 118 based on the emergency session invitation. The E-CSCF 116 can attempt received route options for outbound call routing based on an order of the route options in the contact header. If all the route options received from the LRF 118 have failed, there is no response from the LRF 118, and/or no route options are received from the LRF 118, the E-CSCF 116 can utilize the LRO (e.g., a configured LRO for routing the emergency call). The local-bye status or the remote-bye status can indicate that routing of the emergency call has been confirmed as being successfully completed. The local-bye status can be determine based on a local-bye signal. The remote-bye status can be determined based on a remote-bye signal.

Additionally or alternatively, any of the attribute information (e.g., the call state attribute, the event attribute, and/or the error attribute) can be determined and stored based on a timeout status associated with a timer (e.g., the error attribute can include the timeout attribute). The timeout status of the timer, which can be associated with the E-CSCF 116, can indicate that an amount of time associated with routing of the emergency call has exceeded a threshold amount of time.

The intermediary status signal(s) can be associated with, and/or received from, any component associated with routing the emergency call initiated by the UE 108. For example, the intermediary status signal(s) can be received from the IMS Network 102 (e.g., the LRF 118 or an S-CSCF), the gateway 120, the IP network 122 via the gateway 120, a PSAP in the PSAP network 124, via the gateway 120 and/or the IP network 122) (e.g., the PSAP 126). The local-bye signal can be received, for example, by any component within the IMS network 102. The remote-bye signal can be received, for example, by any component outside of the IMS network 102.

The call state machine 200 can include the emergency call state being set as the re-attempt state 208. The emergency call state can be set as the re-attempt state 208 by changing the state from a current state (e.g., the state set as the trying state 202, the proceeding state 204, or the early state 206) to being set as the re-attempt state 208. The emergency call state can be set as the re-attempt state 208 based on the status being one or more of the reject status, the error status, the timeout status, or the replaced status associated with routing of the emergency call.

In some examples, the call state machine 200 can include the emergency call state being set as the re-attempt state 208, based on one or more of a call state condition 222, a call state condition 224, or a call state condition 226. In some examples, the call state condition 222 can be associated with the emergency call state being set as the trying state 202, in combination with the status being at least one of the reject status, the error status, or the timeout status. The call state condition 224 can be associated with the emergency call state being set as processing state 204, in combination with the status being one or more of the reject status, the error status, or the timeout status. The call state condition 226 can be associated with the emergency call state being set as the early state 206, in combination with the status being at least one of the replaced status or the error status.

The call state machine 200 can include the state set (e.g., re-set) as the trying state 202 subsequent to the emergency call state being set as the re-attempt state 208, based on a call state condition 228. For example, the call state condition 228 can be utilized to change the emergency call state from the re-attempt state 208 to the trying state 202. The E-CSCF 116 again routes the emergency call to the PSAP, based on the emergency call state being set again as the trying state 202. For example, the emergency call is routed differently between the E-CSCF 116 and the PSAP than for an initial state set as the trying state 202. The emergency call can be routed differently any number of times, based on routing instructions received by the E-CSCF 116. The routing instructions can be associated with each time the state is changed from the re-attempt state 208 to the trying state 202. The routing instructions can be stored in the E-CSCF 116 as part of the emergency call processing information.

The call state machine 200 can include the state set as the confirmed state 210, based on a call session signal (e.g., "SIP signal 2xx" (e.g., "SIP signal 200")) being received from the LRF 118. The call state machine 200 can include the state set as the confirmed state 210, by changing the state from being set as the proceeding state 204 or the early state 206, to being set as the confirmed state 210.

The call state machine 200 can include the state set as the confirmed state 210, based on one or more of a call state condition 230 or a call state condition 230. The call state condition 230 can be associated with the emergency call state being set as the proceeding state 204, in combination with a call session signal (e.g., "SIP signal 2xx" (e.g., "SIP signal 200")) being received from the LRF 118. The call state condition 230 can be associated with the state associated with the emergency call being set as the early state 206, in combination with a call session signal (e.g., "SIP signal 2xx" (e.g., "SIP signal 200")) being received from the LRF 118.

The call state machine 200 can include the state being set as the terminated state 212. The emergency call state can be set as the terminated state 212 by changing the state from being set as a current state (e.g., the state set as the trying state 202, the proceeding state 204, the early state 206, the re-attempt state 208, or the confirmed state 210) to being set as the terminated state 212. The emergency call state can be set the terminated state 212, in combination with the status being one or more of the canceled status, the end of route status, the timeout status, the local-bye status, or the remote-bye status associated with routing of the emergency call.

In some examples, the call state machine 200 can include the state set as the terminated state 212, based on one or more of a call state condition 234, a call state condition 236, a call state condition 238, a call state condition 240, or a call state condition 242. The call state condition 234 can be associated with the emergency call state being set as the trying state 202, in combination with the status being one or more of the canceled status or the timeout status. The call state condition 236 can be associated with the emergency call state being set as the re-attempt state 208, in combination with the status being one or more of the canceled status, the end of route status, or the timeout status. The call state condition 238 can be associated with the emergency call state being set as the proceeding state 204, in combination with one or more of the canceled status or the timeout status. The call state condition 240 can be associated with the emergency call state being set as the early state 206, in combination with the status being one or more of the canceled status or the timeout status. The call state condition 242 can be associated with the emergency call state being set as the confirmed state 210, in combination with the status being one or more of the error status, the local-bye status, or the remote-bye status.

In some instances, the call state machine 200 can include states based on route options received in a contact header of a session signal (e.g., a "SIP signal 300" response) received from the LRF 118. For example, the call state machine 200 can include the state as a first contact state (e.g., state associated with a first contact) based on a first route option associated with a first emergency call session associated with the emergency call initiated by the UE 108. The first route option, for example, can be utilized to route the emergency call via a path (e.g., a trunk line) associated with the PSAP. The emergency session invitation associated with the first route option that is transmitted by the E-CSCF 116 can include a header associated with a counter (e.g., first counter), the first counter being associated with starting a timer (e.g., first timer) in the E-CSCF 116. Additionally or alternatively, the call state machine 200 can include the state as a second state (e.g., state associated with a second contact) based on a second route option associated with a second emergency call session associated with the emergency call initiated by the UE 108. The second route option, for example, can be utilized to route the emergency call via a path (e.g., backdoor administration (admin) lines) associated with the PSAP. The emergency session invitation associated with the second route option that is transmitted by the E-CSCF 116 can include a header associated with a counter (e.g., second counter), the second counter being associated with starting timer (e.g., second timer) in the E-CSCF 116.

Additionally or alternatively, the call state machine 200 can include the state as a third state (e.g., the LRO state) based on a third route option associated with a third emergency call session associated with the emergency call initiated by the UE 108. The LRO, for example, can be utilized to route the emergency call via a path (e.g., an emergency call center (e.g., telecommunications response center ((TRC)) associated with the PSAP. The emergency session invitation associated with the third route option that is transmitted by the E-CSCF 116 can include a header associated with a counter (e.g., third counter), the third counter being associated with starting a timer (e.g., third timer) in the E-CSCF 116. Although the first route option can be associated with the trunk line, the second route option can be associated with the admin lines, and the LRO can be associated with the TRC, any route option can utilize any portion of the PSAP to route the emergency call. The second emergency call session and/or the third emergency call session can be processed similarly as for the first emergency call session. In some instances, one or more of the first emergency call session, the second emergency call session, and the third emergency call session can be processed as a same call session with different respective route options, all of the routing options being based on the same routing instructions or different respective routing instructions.

The E-CSCF 116 can process, via the call state machine 200, one or more of the first emergency call session, the second emergency call session, and the third emergency call session. The emergency call can be routed as the first emergency call session by different devices (e.g., one or more devices within the gateway (e.g., gateway 120), one or more devices within other gateways utilized to route signals between the IMS network 102 and the PSAP, or one or more other devices (e.g., an MSS)), than for the emergency call being routed as the second emergency call session and/or the third emergency call session.

In some instances, each of the first emergency call session, the second emergency call session, and the third emergency call session can be processed as a same session that has a unique/different path, respectively, associated with routing the emergency call from the UE 108 to the PSAP. The first emergency call session, the second emergency call session, and/or the third emergency call session can be routed by the E-CSCF 116 in any order and/or at any time (e.g., sequentially, simultaneously, etc.).

Therefore, and as described herein, the LRF and/or the GMLC can be utilized to obtain an emergency call processing and/or routing status more easily than in conventional technology. The GMLC can receive notifications from the E-CSCF, which includes the re-attempt state set as a different state to track routing failures associated with the emergency call. The re-attempt state can be utilized by the E-CSCF to monitor the routing failures and provide information associated with the failures to the GMLC.

The routing information stored in the GMLC allows call servers to accurately reflect states. Because the call servers are capable of doing multiple retries (e.g., different emergency call routing based on a routing option) if a first attempt at routing the emergency call fails, the GMLC can track respective states associated with the routing option, determine call routing associated with each re-attempt, and provide details to the call servers associated with causes of failures.

The GMLC can monitor and transmit each notification received from the E-CSCF to a call server. The call server can line up the notifications and reproduce a state processing logic based on the notifications to show exactly what happened for routing of an emergency call, regardless of whether the PSAP is an NG 911 PSAP or a legacy circuit-switched PSAP. The call server does not have to rely on second-hand information of an ALI signal, as in conventional technology.

Furthermore, the E-CSCF can route the emergency call to a BGCF and/or an MSS based on the initial state associated with a first route option being set to a trying state after the emergency call is initiated. The E-CSCF can route the emergency call to a different BGCF and/or a different MSS based on the state associated with the first route option being subsequently set again to the trying state (e.g., changed from the re-attempt state to the trying state). The E-CSCF can separately route the emergency call for a second route option and/or an LRO similarly as for the first route option. Respective states for the first route option, the second route option, and the LRO can be determined and stored by the E-CSCF. Respective notifications can be transmitted to the GMLC for each of the states associated with each of the route options.

Figure 3:
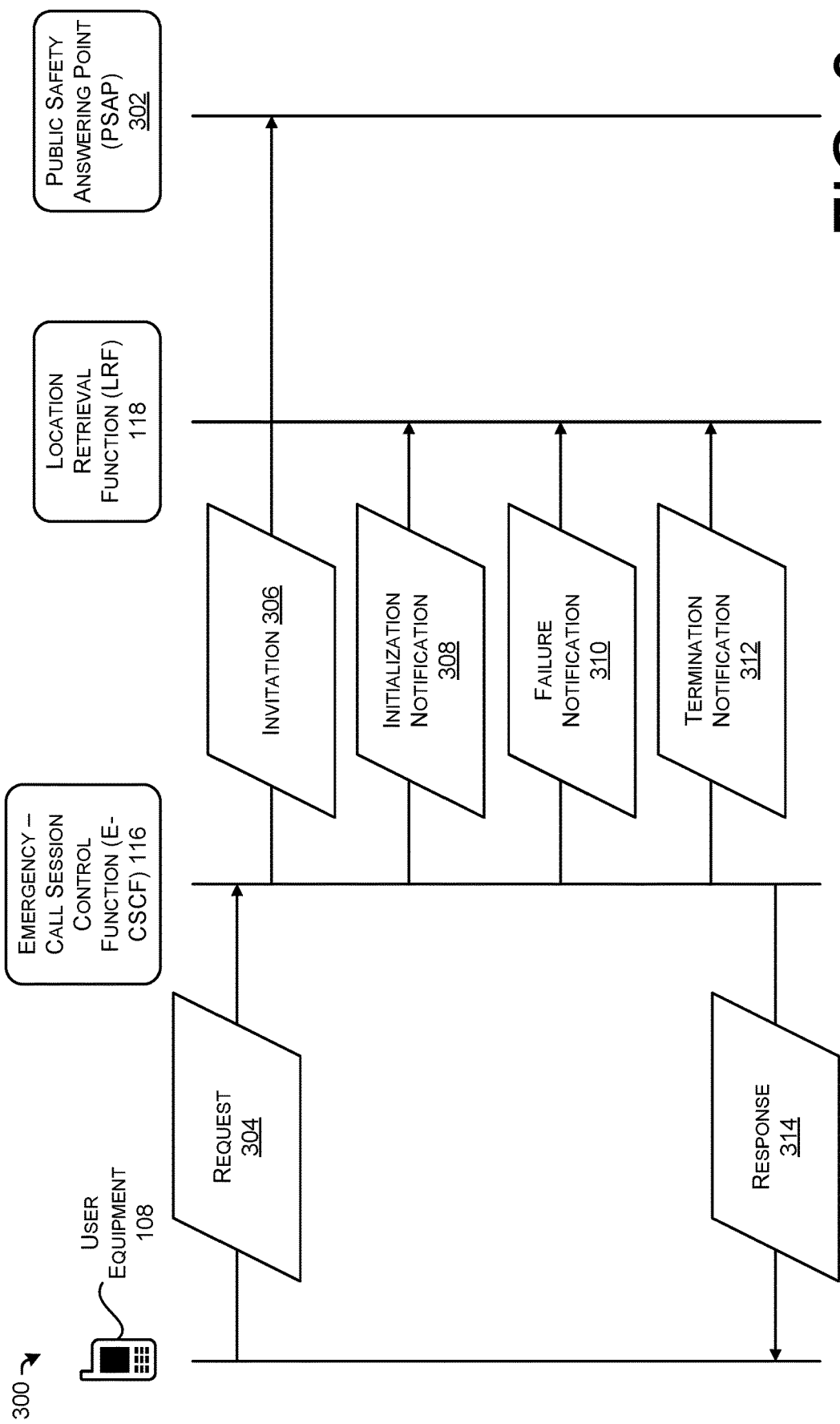
FIG. 3 is a diagram illustrating example signaling between a user equipment (UE), an emergency-call session control function (E-CSCF) node, a location retrieval function (LRF), and a public-safety answering point (PSAP), as described herein.

FIG. 3 is a diagram illustrating example signaling 300 between a user equipment (UE), an emergency-call session control function (E-CSCF) node, a location retrieval function (LRF), and a public-safety answering point (PSAP), as described herein. As illustrated, the signaling 300 includes interactions between the UE 108, the E-CSCF 116, the LRF 118, which are described above with reference to FIG. 1, and a public safety answering point (PSAP) 302. The PSAP 302 can be included, for example, as one of the PSAPs in the PSAP network 124 described above with reference to FIG. 1A. Alternatively, the PSAP 302 can be included, for example, as the PSAP 126 described above with reference to FIG. 1B. In the example illustrated in FIG. 3, the UE 108, the E-CSCF 116, the LRF 118, and the PSAP 302 are different/separate devices connected by one or more communication networks.

The UE 108 can transmit an emergency session request 304 associated with an emergency call initiated by the UE 108. The emergency session request 304 can be routed to the E-CSCF 116 as a next hop, by a proxy call session control function (P-CSCF) node (e.g., P-CSCF 114) that receives the emergency session request 304 from the UE 108.

The E-CSCF 116 can transmit an emergency session invitation 306 (e.g., session initiation protocol (SIP) invitation) based on the emergency session request 304. The emergency session invitation 306 can be routed, via a gateway (e.g., gateway 120) and an IP network (e.g., IP network 122), to the PSAP 302.

The E-CSCF 116 can transmit an initialization notification 308 (e.g., session initiation protocol (SIP) invitation) to the LRF 118. The LRF 118 can include a gateway mobile location center (GMLC). The E-CSCF 116 can set and store a state associated with the emergency call as the trying state 202, based on the initialization notification 308 being transmitted by the E-CSCF 116. The emergency call can be routed to the PSAP 302 based on the initialization notification 308, and further based on routing instructions. The routing instructions can be received from the LRF 118. The routing instructions can include an emergency services router (ESR) number, an identifier associated with a gateway utilized to route the emergency call, and/or an identifier associated with emergency routing services (ERS) representing the PSAP 302.

The E-CSCF 116 can transmit a failure notification 310 to the LRF 118. The failure notification 310 can be transmitted based on one or more event attributes stored in the E-CSCF 116, as discussed above with reference to FIG. 2. The failure notification 310 can be associated with the emergency call state being set as a re-attempt state 208. The failure notification 310 can include the call state attribute (e.g., an attribute associated with a state and/or an information document), the event attribute, and/or the error attribute. In some examples, the event attribute associated with the failure notification 310 can include, based on the emergency call having not been processed, a rejected attribute, an error attribute, a timeout attribute, or a replace attribute. The error attribute, based on the emergency call not being successfully processed as a result of an error, can indicate a type of the error. The error attribute can include an error code (e.g., SIP error code). The error attribute can be associated with the error status. For example, an error code of "486" can be included as the error attribute, based on the error status being associated with the "SIP signal 486".

The E-CSCF 116 can transmit a termination notification 312 to the LRF 118. The termination notification 312 can be associated with the emergency call not being successfully processed by a PSAP, or with the emergency call being successfully processed by a PSAP. The termination notification 312 can be associated with the emergency call state being set as the terminated state 212. The termination notification 312 can include the call state attribute, the event attribute, and/or the error attribute. The event attribute can indicate that the emergency call was processed or not successfully processed by a PSAP. The event attribute associated with the termination notification 312, based on the emergency call not being successfully processed, can include a cancel attribute, a rejected attribute, a replace attribute, a local-bye attribute; a remote-bye attribute, an error attribute, or a timeout attribute. The event attribute can be determined based on operation of the UE 108 (e.g., the cancel attribute can be included as the event attribute based on the emergency call being canceled due to a user hanging up) or an intermediary status signal (e.g., "SIP signal 486"). The error attribute, based on the emergency call not being successfully processed as a result of the error, can indicate the type of the error.

The E-CSCF 116 can transmit an emergency session response 314 associated with the emergency call initiated by the UE 108. The emergency session response 314 can be routed to the UE 108. For example, the emergency session response 314 can be routed to the UE 108 by the P-CSCF 114. The emergency session response 314 can indicate (e.g., acknowledge) to the UE 108 that processing of the emergency call has stopped.

Figure 4:
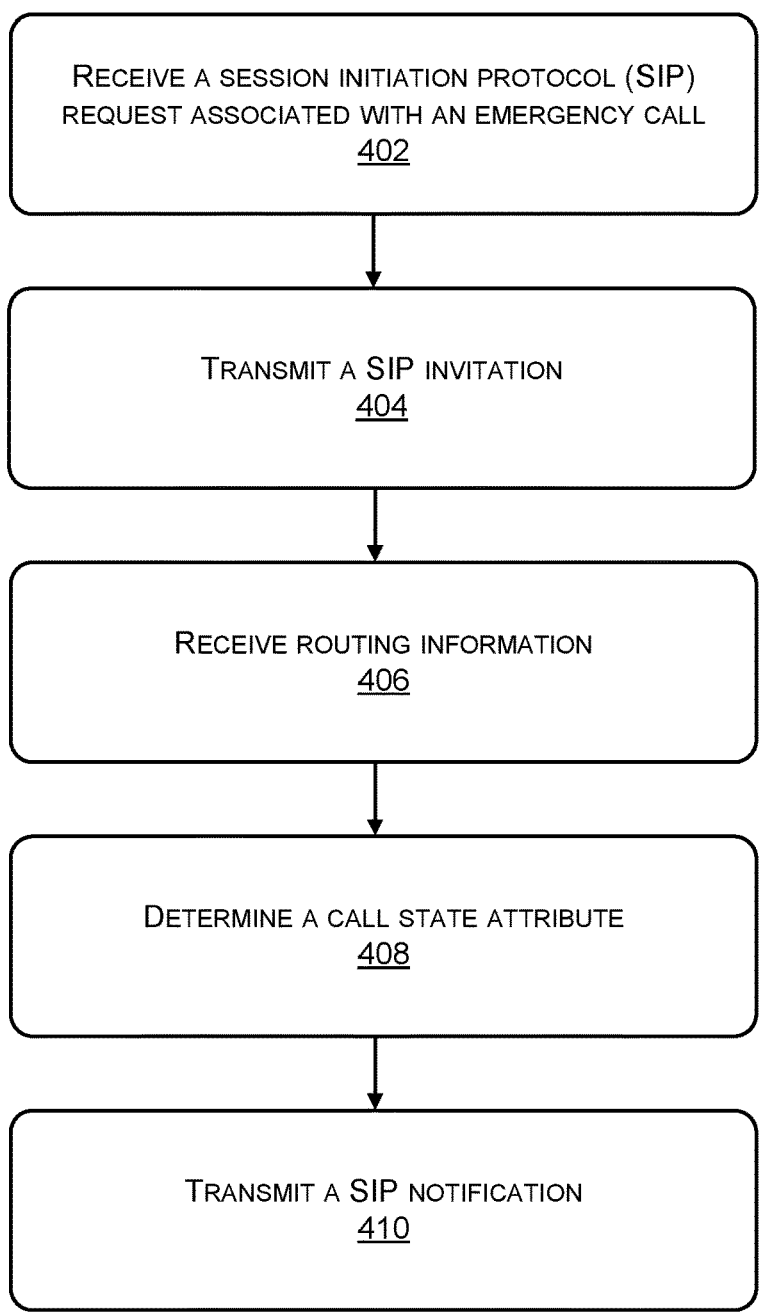
FIG. 4 illustrates an example process that includes emergency call processing by an emergency-call session control function (E-CSCF) node, in accordance with some examples of the present disclosure.

FIG. 4 illustrates an example process that includes emergency call processing by an emergency-call session control function (E-CSCF) node, in accordance with some examples of the present disclosure. The process is illustrated as a logical flow graph, each operation of which represents a sequence of operations that can be implemented in hardware, software, or a combination thereof. In the context of software, the operations represent computer-executable instructions stored on one or more computer readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The example process 400 can be performed by an IMS node (e.g., E-CSCF 116) or another component, in connection with other components discussed herein.

At operation 402, the process can include receiving a Session Initiation Protocol (SIP) request associated with a communication session associated with an emergency call for a user equipment (UE) (e.g., UE 108). The SIP request can be received from the UE 108, based on the UE 108 initiating the emergency call.

At operation 404, the process can include transmitting a SIP invitation (e.g., invitation 306) associated with the emergency call. The SIP invitation can be transmitted to a public-safety answering point (PSAP).

At operation 406, the process can include receiving routing instructions associated with routing of the emergency call. The routing instructions can be received from the LRF 118 and utilized to determine a BGCF for routing of the emergency call to the PSAP.

At operation 408, the process can include determining a call state attribute associated with processing of the emergency call, the call state attribute being associated with an emergency call state set as a re-attempt state. The call state attribute can include an identifier indicating the emergency call state of the E-CSCF 116. An event attribute can be determined that indicates a reject status, an error status, a replaced status, a canceled status, a local-bye status, a remote-bye status, and/or an end of route option status. An error attribute can be determined, based on the emergency call not being successfully processed as a result of an error. The error attribute can indicate a type of the error. The error attribute can include an error code. For example, an error code (e.g., "4xx" or "5xx") can be included as the error attribute, based on the error status being associated with a SIP signal (e.g., the "SIP signal 4xx" or "SIP signal 5xx," respectively) received by the E-CSCF 116.

At operation 410, the process can include transmitting a SIP notification (e.g., failure notification 310) based at least in part on the call state attribute, the SIP notification including information associated with a failure of the processing of the emergency call. The failure notification 310 can include the call state attribute, the event attribute, and/or the error attribute. In some examples, the event attribute associated with the failure notification 310 can include, based on the emergency call having not been processed, a rejected attribute, an error attribute, or a timeout attribute. The error attribute, based on the emergency call not being successfully processed as a result of an error, can indicate a type of the error.

Figure 5:
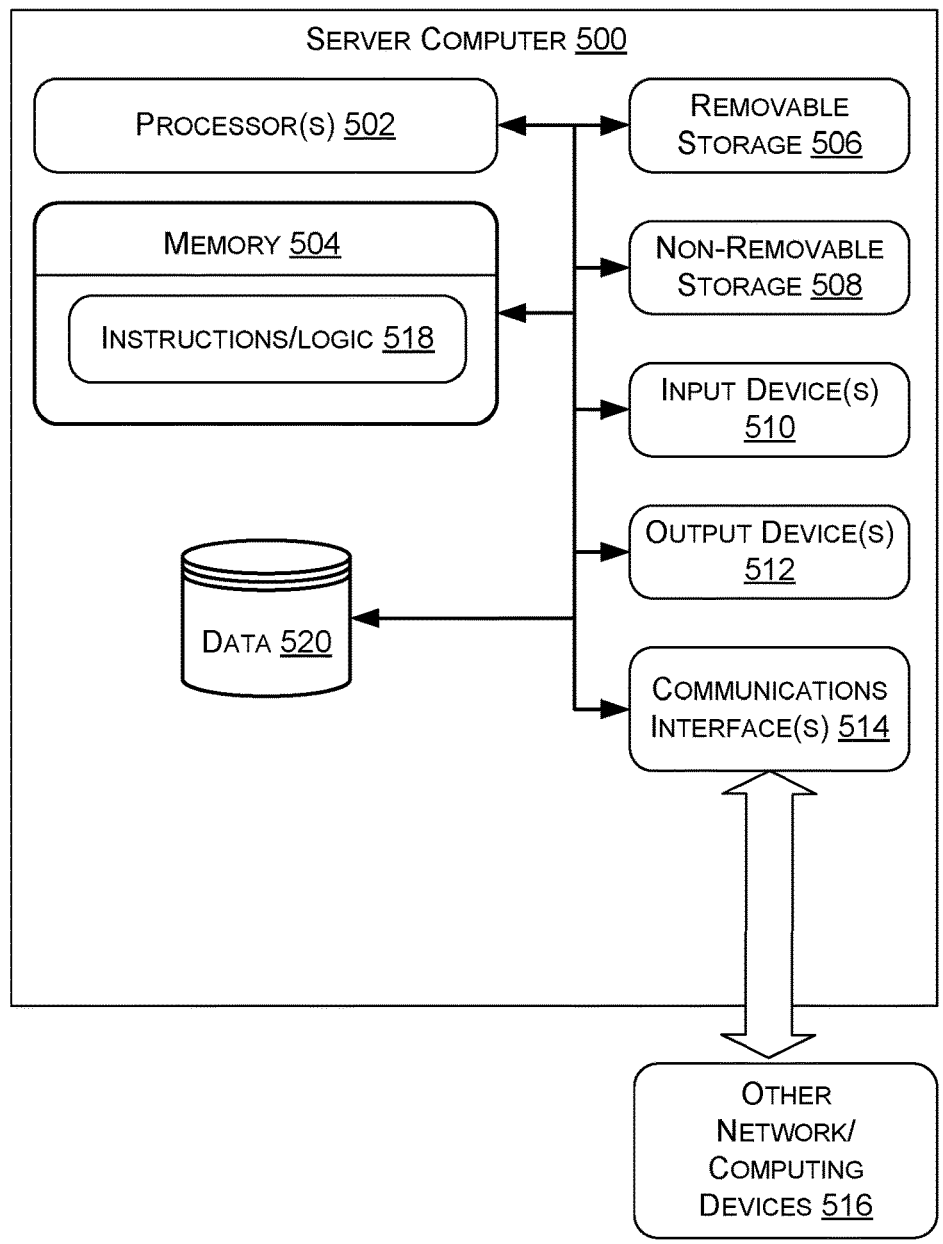
FIG. 5 is a block diagram of an emergency-call session control function (E-CSCF) node architecture, in accordance with some examples of the present disclosure.

FIG. 5 illustrates is a block diagram of a server computer 500 architecture, in accordance with some examples of the present disclosure. As shown, the server computer 500 can include one or more processors 502 and one or more forms of computer-readable memory 504. The server computer 500 can also include additional storage devices. Such additional storage can include removable storage 506 and/or non-removable storage 508.

The server computer 500 can further include input devices 510 and output devices 512 communicatively to the processor(s) 502 and the computer-readable memory 504. The server computer 500 can further include communications interface(s) 514 that allow the server computer 500 to communicate with other network/computing devices 516 such as via a network. The communications interface(s) 514 can facilitate transmitting and receiving wired and/or wireless signals over any suitable communications/data technology, standard, or protocol, as described herein. For example, the communications interface(s) 514 can comprise a SIP (ISC) interface configured to transmit SIP traffic/signaling to the other network/computing devices 516, such as the UE 108 and/or the IMS node(s) 112, via a network.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 can also be described as computer storage media and can include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 500. Any such computer-readable storage media can be part of the server computer 500.

The memory 504 can include computer-executable instructions 518 (or logic 518) that, when executed, by the processor(s) 502 perform the various acts and/or processes disclosed herein. The instructions/logic 518 of the server computer 500 can further comprise logic for transmitting messages and data over the communications interface(s) 514, using any suitable protocol (e.g., SIP, Diameter, etc.).

The server computer 500 can also maintain or persist data 520 in any suitable type of data repository, such as a database. For example, the data 520 can include the attribute information, as discussed above with reference to FIG. 2.

The environment and individual elements described herein can of course include many other logical, programmatic, and physical components, of which those shown in the accompanying figures are merely examples that are related to the discussion herein. Various terms (e.g., computers, components, devices, nodes, etc.) described herein associated with components that perform functions associated with processing of the emergency call vary for stylistic purposes and/or clarity, but are not limited thereto and can be used interchangeably.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. An IP multimedia subsystem (IMS) node, comprising:
one or more processors; and
memory storing computer-executable instructions that, when executed by the one or more processors, cause the one or more processors to perform operations comprising:

receiving a session initiation protocol (SIP) request associated with a communication session associated with an emergency call for a user equipment (UE);

receiving status information associated with the communication session;

determining a call state attribute based on the status information, the call state attribute associated with an emergency call state being set as a re-attempt state;

transmitting a SIP notification based on the call state attribute, the SIP notification including information associated with a failure of processing of the emergency call;

changing the emergency call state associated with the call state attribute from the re-attempt state to a trying state and then to a proceeding state, based on the communication session being routed differently;

based on another failure, changing the emergency call state associated with the call state attribute from the proceeding state to the re-attempt state; and determining an event attribute based on the status information, the event attribute being associated with at least one of a reject status, an error status, or a timeout status.

2. The IMS node of claim 1, the operations further comprising:

transmitting a SIP invitation associated with the emergency call;

setting the emergency call state associated with the call state attribute as a trying state based on the SIP invitation being transmitted; and changing the call state attribute to set the emergency call state associated with the call state attribute as the re-attempt state based on the status information.

3. The IMS node of claim 1, the operations further comprising:

receiving second status information; and updating the call state attribute to change the emergency call state associated with the call state attribute from the re-attempt state to a terminated state, based on the second status information.

4. The IMS node of claim 1, the operations further comprising:

setting the emergency call state associated with the call state attribute as a terminated state; and transmitting a second SIP notification based on the information associated with the failure of the processing of the emergency call.

5. The IMS node of claim 1, the operations further comprising:

determining an event attribute based on the status information, wherein the event attribute being associated with the emergency call state set as the re-attempt state comprises at least one of a reject attribute, an error attribute, a timeout attribute, or a replace attribute.

6. The IMS node of claim 1, the operations further comprising:

setting the emergency call state associated with the call state attribute as a terminated state; and determining an event attribute based on the status information, wherein the event attribute being associated with the emergency call state set as the terminated state comprises at least one of a cancel attribute, a reject attribute, a replace attribute, a local-bye attribute; a remote-bye attribute, an error attribute, or a timeout attribute.

7. The IMS node of claim 1, wherein the emergency call state associated with the call state attribute is changed from a trying state to the re-attempt state, based on the status information indicating an error associated with a device in an IMS network.

8. The IMS node of claim 1, wherein the emergency call state associated with the call state attribute is set to the re-attempt state, based on the status information comprising a reject attribute, the reject attribute associated with a device in an IMS network rejecting the communication session.

9. The IMS node of claim 1, wherein changing the emergency call state associated with the call state attribute from the trying state to a proceeding state is based on a call session signal without a tag being received from a location retrieval function (LRF).

10. The IMS node of claim 1, wherein the failure of processing of the emergency call comprises a timeout associated with the processing of the emergency call, the operations further comprising:

changing the emergency call state associated with the call state attribute from the re-attempt state to a trying state based on the communication session being routed differently.

11. A system comprising:

one or more processors;

a memory; and one or more components stored in the memory and executable by the one or more processors to perform operations comprising:

receiving a session initiation protocol (SIP) request associated with a communication session associated with an emergency call for a user equipment (UE);

receiving status information associated with the communication session;

determining a call state attribute based on the status information, the call state attribute associated with an emergency call state being set as a re-attempt state;

transmitting a SIP notification based on the call state attribute, the SIP notification comprising information associated with a failure of processing the emergency call;

changing the emergency call state associated with the call state attribute from the re-attempt state to a trying state and then to a proceeding state, based on the communication session being routed differently;

based on another failure, changing the emergency call state associated with the call state attribute from the proceeding state to the re-attempt state; and determining an event attribute based on the status information, the event attribute being associated with at least one of a reject status, an error status, or a timeout status.

12. The system of claim 11, the operations further comprising:

transmitting a SIP invitation associated with the emergency call;

setting the emergency call state associated with the call state attribute as a trying state, based on the SIP invitation being transmitted; and changing the call state attribute to set the emergency call state associated with the call state attribute as the re-attempt state based on the status information.

13. The system of claim 11, the operations further comprising:
receiving second status information; and
updating the call state attribute to change the emergency call state associated with the call state attribute from the re-attempt state to a terminated state based on the second status information.

14. The system of claim 11, the operations further comprising:
setting the emergency call state associated with the call state attribute as a terminated state; and
transmitting a second SIP notification based on the information associated with the failure of processing the emergency call.

15. The system of claim 11, the operations further comprising:
determining an event attribute based on the status information,
wherein the event attribute being associated with the emergency call state set as the re-attempt state comprises at least one of a reject attribute, an error attribute, a timeout attribute, or a replace attribute.

16. The system of claim 11, the operations further comprising:
setting the emergency call state associated with the call state attribute as a terminated state; and
determining an event attribute based on the status information,
wherein the event attribute being associated with the emergency call state set as the terminated state includes at least one of a cancel attribute, a reject attribute, a replace attribute, a local-bye attribute; a remote-bye attribute, an error attribute, or a timeout attribute.

17. A method comprising:
receiving a session initiation protocol (SIP) request associated with a communication session associated with an emergency call for a user equipment (UE);
receiving status information associated with the communication session;
determining a call state attribute based on the status information, the call state attribute associated with an emergency call state being set as a re-attempt state;
transmitting a SIP notification based on the call state attribute, the SIP notification comprising information associated with a failure of processing of the emergency call;
changing the emergency call state associated with the call state attribute from the re-attempt state to a trying state and then to a proceeding state, based on the communication session being routed differently;
based on another failure, changing the emergency call state associated with the call state attribute from the proceeding state to the re-attempt state; and
determining an event attribute based on the status information, the event attribute being associated with at least one of a reject status, an error status, or a timeout status.

18. The method of claim 17, further comprising:
transmitting a SIP invitation associated with the emergency call;
setting the emergency call state associated with the call state attribute as a trying state, based on the SIP invitation being transmitted; and
changing the call state attribute to set the emergency call state associated with the call state attribute as the re-attempt state based on the status information.

19. The method of claim 17, further comprising:
receiving second status information; and
updating the call state attribute to change the emergency call state associated with the call state attribute from the re-attempt state to a terminated state based on the second status information.

20. The method of claim 17, further comprising:
setting the emergency call state associated with the call state attribute as a terminated state; and
transmitting a second SIP notification based on the information associated with the failure of processing of the emergency call.

* * * * *